United States Patent [19]
Beutel et al.

[11] Patent Number: 5,785,620
[45] Date of Patent: Jul. 28, 1998

[54] DRIVE ASSEMBLY

[75] Inventors: Wolfgang Beutel, Lage; Julius Ewertowski, Enger, both of Germany

[73] Assignee: Boge Kompressoren Otto Boge GmbH & Co. KG, Bielefeld, Germany

[21] Appl. No.: 571,904

[22] PCT Filed: Apr. 18, 1995

[86] PCT No.: PCT/EP95/01443

§ 371 Date: Apr. 29, 1995

§ 102(e) Date: Apr. 29, 1995

[87] PCT Pub. No.: WO95/28570

PCT Pub. Date: Oct. 26, 1995

[30] Foreign Application Priority Data

Apr. 18, 1994 [DE] Germany ............... 44 13 422.3

[51] Int. Cl.$^6$ ............................................... F16H 7/12
[52] U.S. Cl. ............................................ 474/132; 474/101
[58] Field of Search ................................. 474/161, 132, 474/273, 148, 150

[56] References Cited

U.S. PATENT DOCUMENTS

| | | | |
|---|---|---|---|
| 1,194,010 | 8/1916 | Goodyear | 474/132 |
| 2,570,773 | 10/1951 | Davis | 474/123 X |
| 4,094,205 | 6/1978 | Cook | 74/242.1 FP |
| 4,568,030 | 2/1986 | Weichel | 241/101.2 |
| 4,761,154 | 8/1988 | Beauchamp et al. | 474/101 |
| 4,781,662 | 11/1988 | Walker | 474/135 X |

FOREIGN PATENT DOCUMENTS

| | | |
|---|---|---|
| 2 093 149 | 8/1982 | European Pat. Off. . |
| 548600 | 1/1923 | France . |
| 1082391 | 12/1954 | France . |
| 131688 | 7/1901 | Germany . |
| 138124 | 5/1902 | Germany . |
| 156042 | 3/1903 | Germany . |
| 75 21 688.5 | 7/1975 | Germany . |
| 55-066248 | 5/1980 | Japan . |

Primary Examiner—Roger J. Schoeppel
Attorney, Agent, or Firm—Knobbe, Martens, Olson & Bear, LLP

[57] ABSTRACT

The present invention relates to a drive assembly having an endless rotating drive element which runs over a driving gear of a motor and a driven gear of a machine and a tensioning device for the drive element. The motor is arranged on a support which is supported in a positionally variable manner on a frame that carries the machine, and which is pretensioned vertically downwards by both the weight (G) of the motor and a pretensioning force (F) of a pretensioning unit which acts substantially in parallel with the weight (G) of the motor.

15 Claims, 6 Drawing Sheets

DRIVE ASSEMBLY

FIELD OF THE INVENTION

The present invention relates to a drive assembly comprising an endless rotating drive element which runs over a driving gear of a motor and a driven gear of a machine, and a tensioning means for the drive element.

BACKGROUND OF THE INVENTION

Very different types of drive assemblies of the above-described kind are known; for instance, the drive element may be formed as a V-belt, a flat belt, a chain, etc.

Especially with belt drives, an exact adjustment of the belt tension is required. Excessive belt tension leads to an overload of the motor and the working device and to premature wear of bearings, seals and the belt. With V-belts, a pretension which is too high by 10% reduces the service life by 20%; an increase in pretension by 20% reduces the service life by more than 50%. When the belt tension is too low, the belt may slip, resulting in heating and short-term wear of the belt. Moreover, the efficiency of the machine is reduced considerably.

As for the tensioning of the drive element, different solutions follow from the prior art. One solution is that the axes or shafts of the motor and the machine which are parallel with each other are varied by a tensioning device as to their spacing, i.e., either the motor or the machine is moved on a slide. To this end the shafts of the motor and the machine must each be adjusted in an exact manner. This presents great difficulties, especially when the belt is changed. Furthermore, it is only possible under great difficulties to tension the drive element/the belt in the desired manner.

Another principle consists in tensioning the drive element/belt by means of a tension pulley. The latter may be arranged internally or externally. It has been found to be of disadvantage that an additional tension pulley produces an additional bending stress in the belt/drive element, thereby additionally stressing the latter. Such an additional stress or load is, for instance, created by a kneading of the belt, so that the belt will heat up and wear. Furthermore, the tension pulley excludes an enclosing angle of the driving gear and of the driven gear, thus possibly leading to undesired forces and loads.

Another variant consists in supporting the motor stationarily on a frame and in arranging the machine of a considerably smaller weight on a rocker. To tension the drive element/belt, the rocker is tensioned away from the motor by means of a spring. It is here disadvantageous that the pretension must be adjusted accurately and controlled frequently. An elongation of the belt will change the pretension, which may lead to slip. It is also disadvantageous that fatigue phenomena may be observed, resulting in a reduced pretensioning force.

SUMMARY OF THE INVENTION

It is the object of the present invention to provide a drive assembly of the above-mentioned type which, being of a simple structure and usable in a simple, reliable manner, permits an exact pretensioning of the drive element at which the drive element can be easily exchanged and which prevents damage during transportation of the drive assembly.

In accordance with the invention, this object is achieved in that the motor is arranged on a support which is supported in a positionally variable manner on a frame that carries the machine, and which is pretensioned vertically downwards by both the weight of the motor and by a pretensioning force of a pretensioning unit which acts substantially in parallel with the weight of the motor.

The drive assembly of the invention is characterized by a number of considerable advantages. Since the weight of the motor pretensions the drive element, one obtains a defined tensioning force throughout the service life of the drive element. Elongations of the drive element are compensated automatically. Since the weight of the motor does not change, a pretensioning force which is always constant is applied by the motor.

Another essential advantage is that the accelerating torque supports the pretension of the drive belt during start of the motor. The pretension might thus be even slightly increased to exclude slippage during start of the motor. The arising accelerating forces are reliably transmitted thereby. When the motor runs under load, the operating torque also helps to increase pretension and to reduce slippage. A slip-free power flow is thus ensured in every operative situation.

It is possible with the additional pretensioning unit provided according to the invention to apply a sufficient pretensioning force even in the case of lightweight motors. With the described construction, the pretensioning force of the pretensioning unit need only be adjusted during assembly of the drive assembly; readjustment or maintenance during operation is not necessary. Furthermore, the pretensioning unit need not be adjusted after the belt has been exchanged. This leads to quite considerable advantages as to operational reliability and service life of the drive element. Furthermore, maintenance errors which may be made by untrained staff or might be due to improper readjustment of a tensioning means are excluded.

In an especially advantageous development of the invention, the support is shaped in the manner of a rocker which is pivotable about a horizontal axis or shaft. Adequate pretensioning forces can be applied owing to the rocker by choosing a suitable efficient lever length and a corresponding arrangement of the horizontal shaft.

The drive element may be in the form of a V-belt according to the invention. A plurality of V-belts which are in parallel with each other may be provided.

The pretensioning unit preferably comprises a compression spring which is designed such that it is adjustable. It is here advantageous when the compression spring rests with one side on the frame and with its other side on a pressure plate connected to the support, and when the position of the pressure plate is variable to adjust the spring force.

The pressure plate can be adjusted with the aid of a support bolt which is provided with an external thread and which extends through the spring and which is secured with one end to the support and is guided with the other end in a longitudinally displaceable manner on the frame.

An essential aspect of the drive assembly of the invention is also that it is possible to compress the pretensioning unit, the compression spring, by means of the support bolt. This will relieve the drive element (V-belt). It is thus possible in an especially simple manner to change the drive element. Furthermore, the compressed position serves to transport the drive assembly, since damage to the V-belt, for instance, by impacts, etc., is excluded.

It is possible with the drive assembly of the invention to arrange the machine above or next to the motor. The desired automatic pretension is obtained in both cases.

BRIEF DESCRIPTION OF THE DRAWINGS

The invention shall now be described with reference to an embodiment taken in conjunction with the drawing, in which.

DESCRIPTION OF THE PREFERRED EMBODIMENTS

Figure 1:
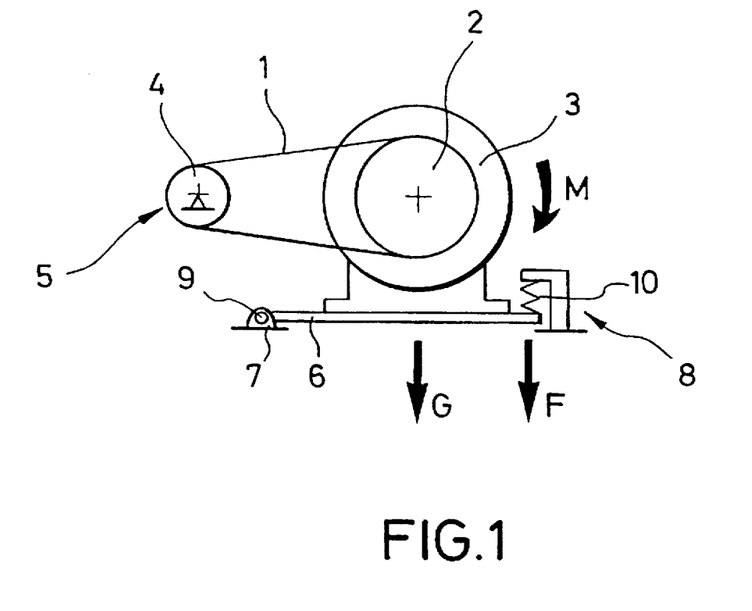
FIG. 1 is a diagrammatic lateral view of the drive assembly of the invention.
Figure 2:
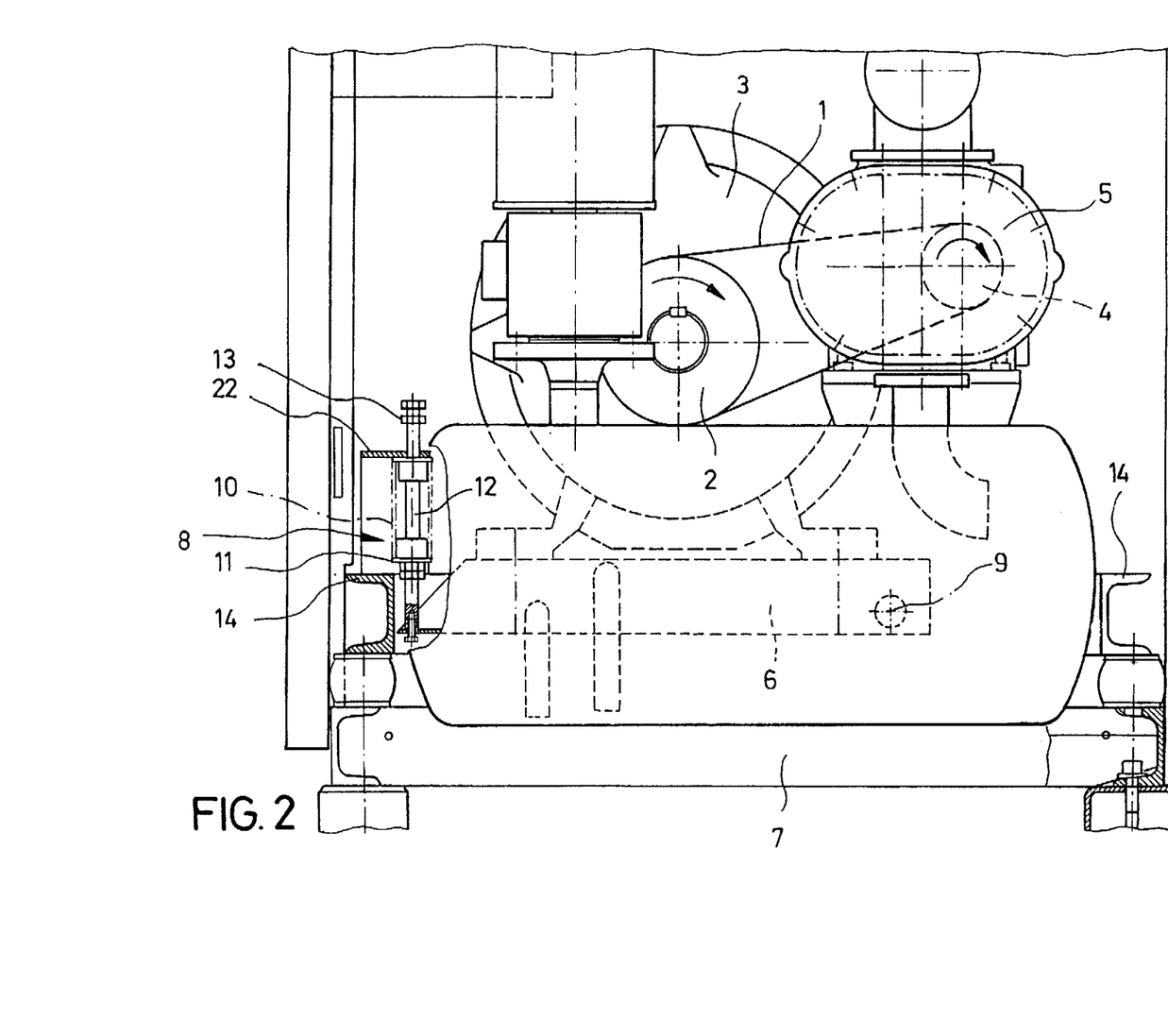
FIG. 2 is a front view, similar to FIG. 1, of an embodiment of the drive assembly of the invention.

FIG. 1 diagrammatically illustrates the design of the automatic belt drive according to the invention. The belt drive includes an endless rotating drive element 1, for instance in the form of a V-belt. The drive element runs over a driving gear 2 of a motor 3 and over a driven gear 4 of a machine 5. The latter may, for instance, be designed as a compressor for producing compressed air.

The motor 3 is mounted on a support 6 which is designed as a rocker adapted to be pivoted about a horizontal shaft 9. Like the bearing of the horizontal shaft 9, the machine 5 is supported on a frame 7 which is stationarily mounted.

FIG. 1 shows that a vertically downwardly oriented weight G of the motor acts downwardly for pivoting support 6. A force resulting from a restoring element M acts in the same manner (the motor rotates counterclockwise in the illustration).

Figure 3:
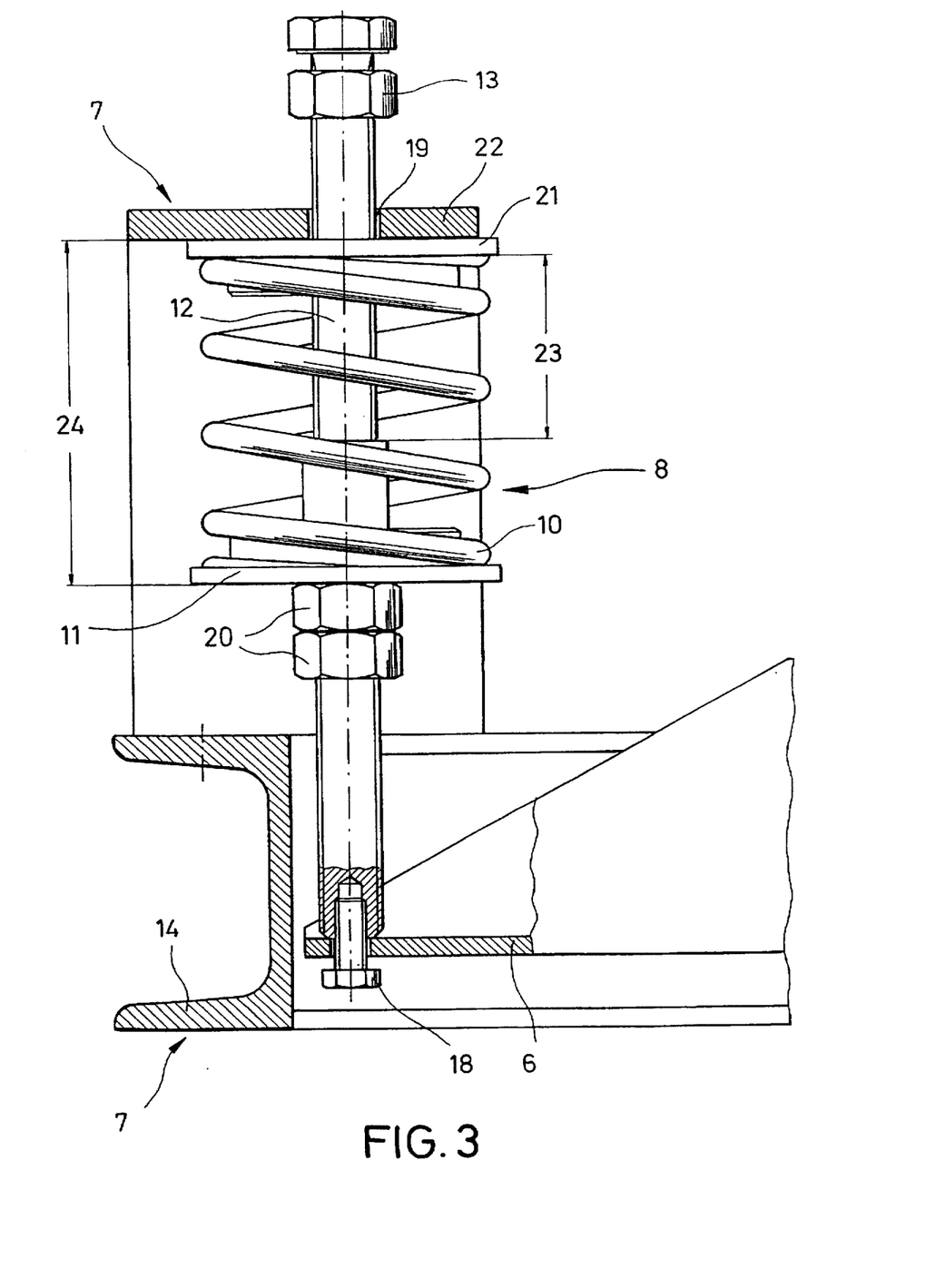
FIG. 3 is an enlarged view of the pretensioning unit shown in FIG. 2.
Figure 4:
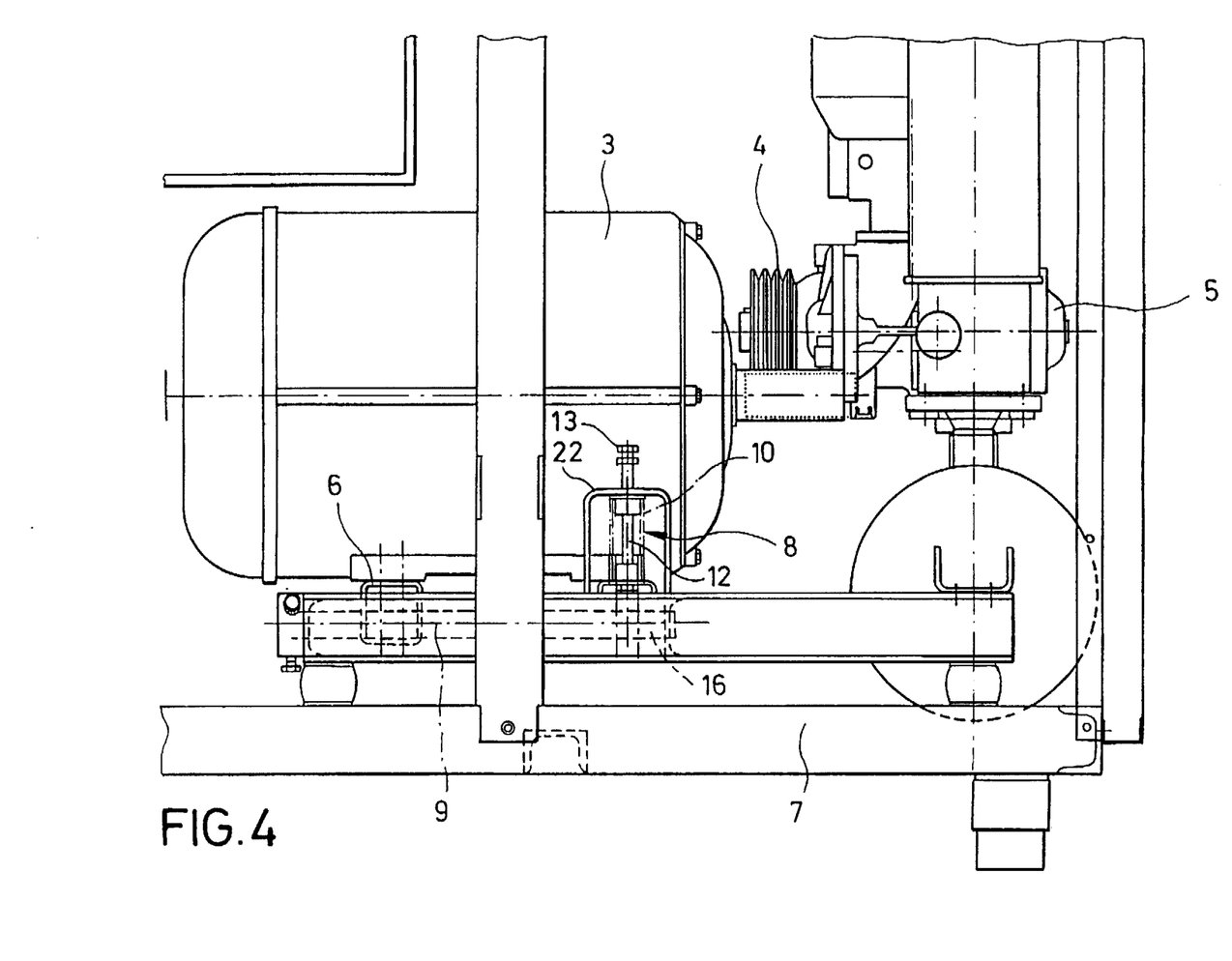
FIG. 4 is a side view of the assembly shown in FIG. 2.

A pretensioning unit 8, which will be described in detail with reference to FIG. 3, is formed at the free end of support 6. The pretensioning unit 8 comprises a compression spring 10 for applying a downwardly directed spring force F. As can be seen, forces G, F and M serve to pretension drive element 1.

Figure 5:
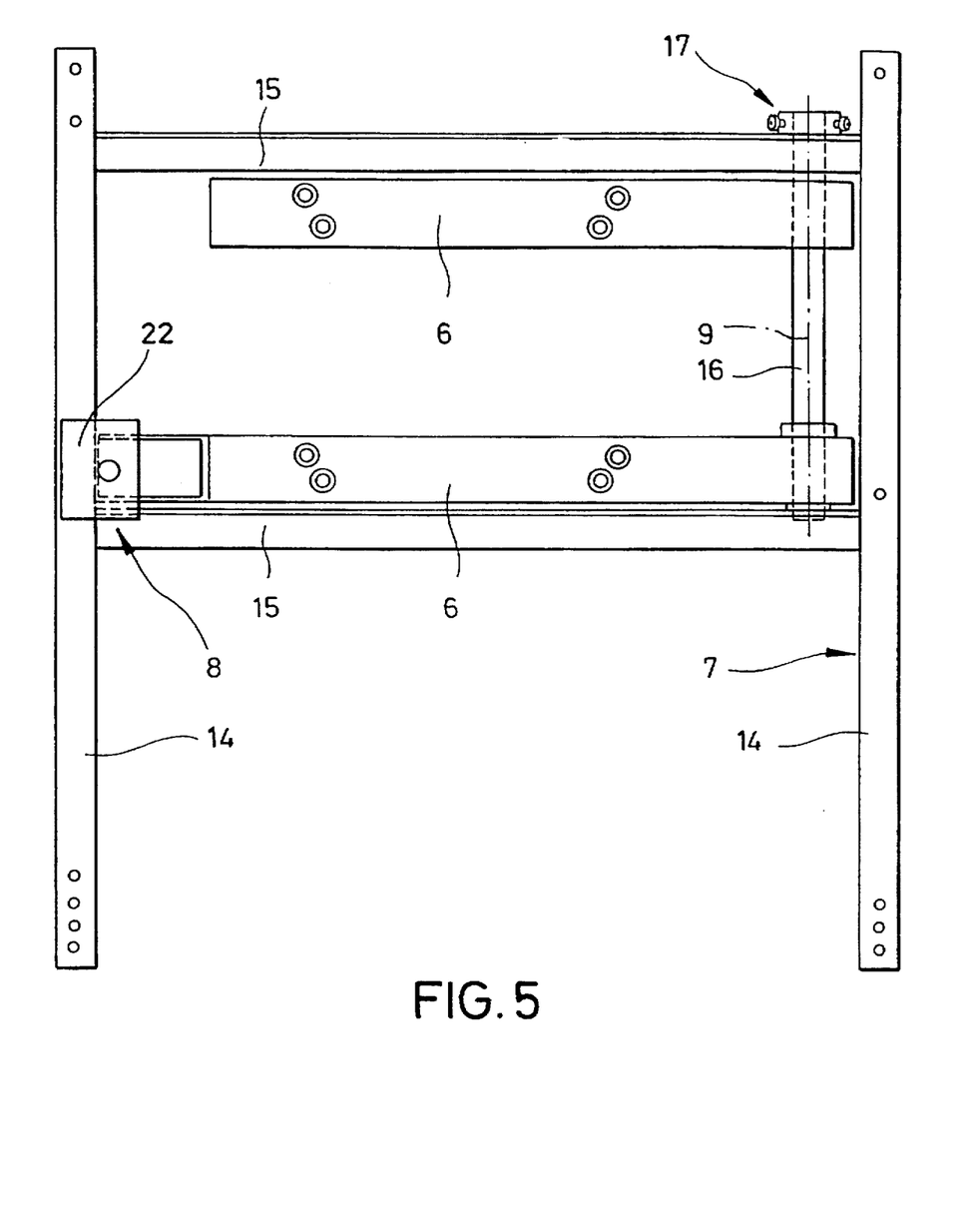
FIG. 5 is a top view on the frame and the support according to the assembly of FIGS. 2 to 4.
Figure 6:
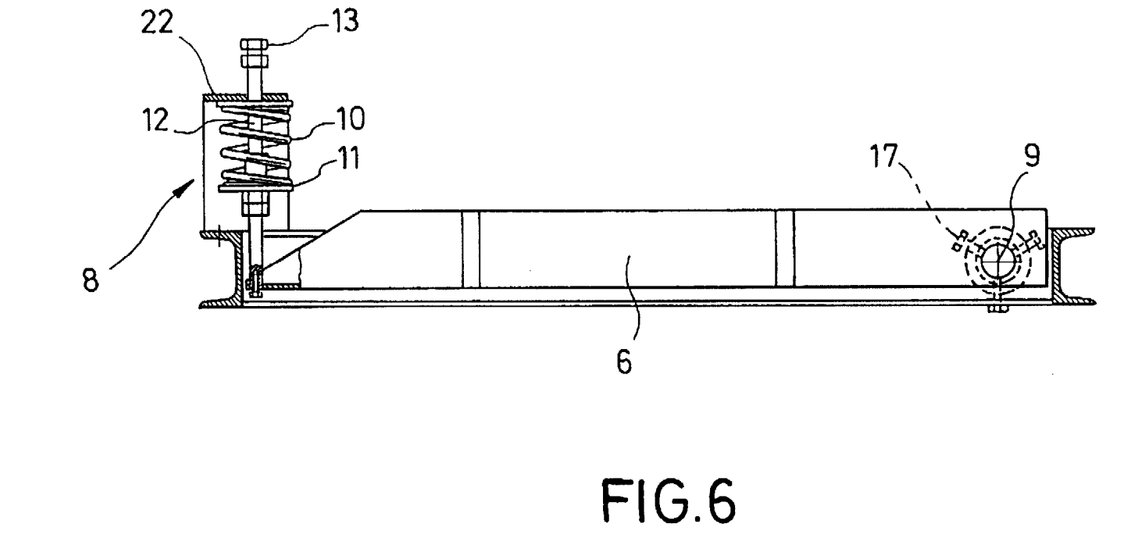
FIG. 6 is a side view, partly in section, of the assembly shown in FIG. 5.

FIGS. 2 to 6 illustrate a specific design of the drive assembly of the invention in a simplified form. Frame 7 as shown in FIG. 5 comprises two longitudinal bars which are in parallel with each other and are connected by means of transverse bars 15. A pivot shaft 16 which is pivotable about a horizontal shaft 9 is supported in the transverse bars 15. FIG. 6 shows that three adjusting screws 17 are provided for adjusting the position of the pivot shaft 16.

As shown in FIG. 5, a support 6 is secured to pivot shaft 16. The support comprises two structural elements that are parallel with each other and have supported thereon motor 3.

The pretensioning unit 8 is formed at the free end of support 6. As specifically shown in FIG. 3, the pretensioning unit comprises a vertically arranged support bolt 12 which is connected to support 6 by means of a screw. Support bolt 12 is provided with an external thread, it extends through compression spring 10 and slides with its upper end through a recess 19 of frame 7.

A pressure plate 11 whose position is fixed by screws 20 relative to support bolt 12 is arranged below compression spring 10. The upper end of compression spring 10 rests via a counterpressure plate 21 on a support portion 22 of frame 7. It is possible by means of a stop 13 which is shaped as a nut to pretension the support bolt 12 upwards against the force of compression spring 10. This possible pretensioning path is shown in FIG. 3 by way of reference numeral 23. Reference numeral 24 shows the tensioning length of compression spring 10.

With the illustrated assembly, it is possible to adjust the pretensioning unit 8 by the factory during assembly. The same applies to the alignment of motor 3 and machine 5 which can be adjusted by means of the adjusting screws 17. These adjustments remain invariable during the whole service life of the drive assembly.

With the aid of the compression spring provided according to the invention, it is possible to apply a constant pretensioning force, also in the case of motors having different weights.

To sum up, the following should be noted:

The invention relates to a drive assembly comprising an endless rotating drive element (1) which runs over a driving gear (2) of a motor (3) and a driven gear (4) of a machine (5), and a tensioning means for the drive element (1), characterized in that motor (3) is arranged on a support (6) which is supported in a positionally variable manner on a frame (7) that carries machine (5), and which is pretensioned vertically downwards by both weight (G) of motor (3) and a pretensioning force (F) of a pretensioning unit (8) which acts substantially in parallel with weight (G) of motor (3). (FIG. 1).

We claim:

1. A drive assembly comprising an endless rotating drive element which runs over a driving gear of a motor and a driven gear of a machine, and a tensioning device for said drive element, wherein said motor is arranged on a support which is supported in a positionally variable manner on a frame that carries said machine, and which is pretensioned vertically downward by both the weight of said motor and a pretensioning force of a compression spring which acts substantially in parallel with the weight of said motor, said compression spring resting with one side on said frame and with its other side on a pressure plate which is connected to said support the position of said pressure plate being adjustable for pretensioning said compression spring and for adjusting said pretensioning force.

2. The drive assembly according to claim 1, wherein said support is designed in the form of a rocker which is pivotable about a horizontal shaft.

3. The drive assembly according to claim 1, wherein said drive element 1 is designed in the form of a V-belt.

4. The drive assembly according to claim 1, wherein said pretensioning unit is made adjustable.

5. The drive assembly according to claim 1, wherein said support has mounted thereon a support bolt which extends through said compression spring and which adjustably supports said pressure plate and is guided in a longitudinally displaceable manner on said frame and that the free end of said support bolt is provided with an adjustable stop.

6. The drive assembly according to claim 5, wherein said adjustable stop is movable into an end position which makes said compression spring inoperative so as to relieve said drive element.

7. The drive assembly according to claim 5, wherein said pressure plate is adjustable relative to said support bolt by way of threaded engagement.

8. The drive assembly according to claim 5, wherein said stop is adjustable relative to said support bolt by way of threaded engagement.

9. A drive assembly, comprising:
 a frame;
 a machine mounted on said frame having a driven gear;
 a support which is supported in a positionally variable manner on said frame;
 a motor mounted on said support having a driving gear;
 an endless rotating drive element coupling the rotation of said driven gear and said driving gear;

a pressure plate which is adjustably positioned on said support; and a compression spring acting between said frame and said pressure plate to apply a pretension to said drive element substantially in parallel with the weight of said motor.

10. The drive assembly of claim 9, wherein said frame includes a pivot on which said support is mounted.

11. The drive assembly of claim 10, wherein said compression spring acts between said frame and a free end of said support opposite said pivot.

12. The drive assembly of claim 9, further including a support bolt mounted on said support which extends through said compression spring and which adjustably supports said pressure plate, the support bolt being guided in a longitudinally displaceable manner on said frame and having a free end provided with an adjustable stop.

13. The drive assembly of claim 12, wherein said adjustable stop is movable into an end position which makes said compression spring inoperative so as to release said drive element of pretension from said compression spring.

14. The drive assembly of claim 12, wherein said pressure plate is adjustable relative to said support bolt by way of a threaded engagement.

15. The drive assembly of claim 12, wherein said stop is adjustable relative to said support bolt by way of a threaded engagement.

* * * * *

UNITED STATES PATENT AND TRADEMARK OFFICE
CERTIFICATE OF CORRECTION

PATENT NO. : 5,785,620
DATED : July 28, 1998
INVENTOR(S) : Beutel et al.

It is certified that error appears in the above-identified patent and that said Letters Patent is hereby corrected as shown below:

On the title page:
Please replace the filing date "Apr. 29, 1995" with
--Apr. 29, 1996--. in the §371 and §102 e date Signed and Sealed this Tenth Day of November 1998

*Attest:*

BRUCE LEHMAN

*Attesting Officer*  Commissioner of Patents and Trademarks